Patented Sept. 15, 1925.

1,554,056

UNITED STATES PATENT OFFICE.

GEORGE O. WILLIAMS, OF DENVER, COLORADO.

METHOD FOR RECOVERING AND PURIFYING RADIUM COMPOUNDS.

No Drawing.  Application filed April 24, 1925.  Serial No. 25,718.

*To all whom it may concern:*

Be it known that I, GEORGE O. WILLIAMS, a citizen of the United States, residing at Denver, in the city and county of Denver, and State of Colorado, have invented certain new and useful Improvements in Methods for Recovering and Purifying Radium Compounds; and I do declare the following to be a full, clear, and exact description of the invention, such as will enable others skilled in the art to which it appertains to make and use the same, reference being had to the accompanying drawings, and to the characters of reference marked thereon, which form a part of this application.

This invention relates to improvements in methods for recovering and purifying radium compounds.

This invention relates to a process by means of which radium values held in suspension in an aqueous mixture can be brought into solution and treated so as to obtain from them a substantially pure radium-barium sulphate.

The ore with or without previously having been concentrated is treated with water and an excess of alkali-metal carbonate, such as sodium or potassium carbonate, and the whole is then heated to, or near to, the boiling point for a short time. This puts the radium into solution.

The alkali-metal carbonate solution carrying the dissolved radium is (if this is necessary) first separated from the heavier suspended matter either by filtration or decantation. The suspended colloidal alumina, silica, etc. must not be removed as it carries a high content of occluded radium.

The solution is now made faintly acid by the addition thereto of sulphuric acid and the carbon dioxide is then expelled either by standing for a time or by boiling, preferably the latter.

A soluble barium salt such as barium chloride or barium nitrate is now added whereby barium sulphate is formed. The resultant suspensions of barium sulphate and colloids (and radium) are agitated so that each particle of colloidal material is scrubbed many times by particles of barium sulphate whereby all of the occluded radium is transferred to the barium sulphate. The radium that is not occluded will be precipitated with the barium sulphate when the soluble barium salt is added. The solution is now allowed to stand and settle. After settling the precipitate of radium and barium sulphates, colloidal alumina, silica, etc. is filtered off and washed.

This precipitate is then treated with concentrated sulphuric acid to dissolve the radium barium sulphate. The resultant solution is filtered to remove the suspended matter. To this filtrate, water is then added in sufficient quantity to cause the radium barium sulphate to reprecipitate, after which the precipitate is removed by filtration. This precipitate of radium barium sulphate relatively free from impurities is the desired product.

In adding the water to the filtrate for the purpose of causing a reprecipitation, it is sometimes desirable to add the water carefully so as to cause incipient precipitation. This initial precipitate of barium sulphate contains most of the radium of the original precipitate and if the addition of the water is properly gauged the precipitate will be highly concentrated. A concentration as high as 100 to 1 or greater may be arrived at by this one step.

The filtrate from the last step may be concentrated by evaporation or treated in any other way or it may be further diluted with water to eliminate the barium sulphate which may be reconverted into chloride, after which the solution may be evaporated to recover the concentrated acid.

Having now described my invention what I claim as new is:

1. The method of precipitating radium from an alkali-metal carbonate solution which consists in acidifying the solution by the use of sulphuric acid, adding a soluble barium salt, dissolving the precipitate in concentrated sulphuric acid, filtering and adding water until radium barium sulphate is reprecipitated.

2. The method of precipitating radium from an alkali-metal carbonate solution which consists in:

(1) Adding sufficient sulphuric acid to make the solution slightly acid.

(2) Expelling the carbonate as by boiling.

(3) Adding a soluble barium salt.

(4) Agitating.

(5) Filtering to remove the radium bearing particles.

(6) Adding concentrated sulphuric acid to the precipitate so as to dissolve the radium barium sulphate.

(7) Filtering and
(8) Adding sufficient water to reprecipitate.

3. The method of treating radium ores so as to separate the radium values which consists in:
(1) Treating an aqueous suspension of ore with an excess of an alkali-metal carbonate.
(2) Heating the mixture whereby the radium is dissolved.
(3) Adding sulphuric acid in sufficient quantity to make the solution slightly acid.
(4) Boiling to expel the carbonate.
(5) Adding a soluble barium salt whereby a barium sulphate is formed.
(6) Subjecting the mixture to agitation.
(7) Filtering.
(8) Dissolving the filtrate in concentrated sulphuric acid.
(9) Filtering to remove impurities, and
(10) Adding water to the filter solution whereby a reprecipitation of radium barium sulphate is obtained.

4. A method of precipitating radium from an alkali-metal carbonate solution, said method consisting in acidifying the solution, by the use of sulphuric acid, adding a soluble barium salt, dissolving the precipitate in concentrated sulphuric acid, filtering the resultant solution to remove the suspended matter and finally adding water carefully or gradually until incipient precipitation results.

In testimony whereof I affix my signature.

GEORGE O. WILLIAMS.